United States Patent
Ojima et al.

(10) Patent No.: US 6,700,273 B1
(45) Date of Patent: Mar. 2, 2004

(54) GAS TRANSFER MACHINE

(75) Inventors: Yoshinori Ojima, Kamakura (JP);
Toshiharu Nakazawa, Chigasaki (JP);
Shinichi Sekiguchi, Yokohama (JP);
Nobuharu Noji, Zushi (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/633,139

(22) Filed: Aug. 4, 2000

(30) Foreign Application Priority Data

Aug. 5, 1999 (JP) .......................................... 11-222761

(51) Int. Cl.[7] .............................................. H02K 17/00
(52) U.S. Cl. ........................... 310/166; 310/43; 310/254
(58) Field of Search ............................ 310/166, 43, 45, 310/168, 156, 162, 269, 254, 216; 417/410.4, 373, 423.7, 410.3

(56) References Cited

U.S. PATENT DOCUMENTS

| 4,916,346 A | * | 4/1990 | Kliman | ....................... 310/216 |
| 5,422,525 A | * | 6/1995 | Mansir | ....................... 310/179 |
| 5,663,605 A | * | 9/1997 | Evans et al. | ................. 310/181 |
| 5,770,933 A | | 6/1998 | Larson et al. | |
| 5,779,453 A | * | 7/1998 | Nagayama et al. | ....... 417/410.4 |
| 5,929,541 A | * | 7/1999 | Naito et al. | ..................... 310/12 |
| 5,990,247 A | * | 11/1999 | Terada et al. | ................ 525/415 |
| 6,020,661 A | * | 2/2000 | Trago et al. | ................... 310/43 |
| 6,097,126 A | * | 8/2000 | Takura | ......................... 310/166 |
| 6,247,906 B1 | * | 6/2001 | Pijanowski | ............... 417/410.4 |

FOREIGN PATENT DOCUMENTS

JP          10-288191        10/1998

* cited by examiner

*Primary Examiner*—Thanh Lam
(74) *Attorney, Agent, or Firm*—Westerman, Hattori, Daniels & Adrian, LLP

(57) ABSTRACT

A gas transfer machine for use as a vacuum pump, for example, has a pump rotor mounted on a rotatable shaft for transferring a gas, and a reluctance-type motor for rotating the rotatable shaft. The reluctance-type motor has a stator, a motor rotor surrounded by the stator, and a shield member isolating the stator from the motor rotor. The motor rotor is directly coupled to the rotatable shaft and has a plurality of magnetic salient poles.

9 Claims, 6 Drawing Sheets

FIG. 4
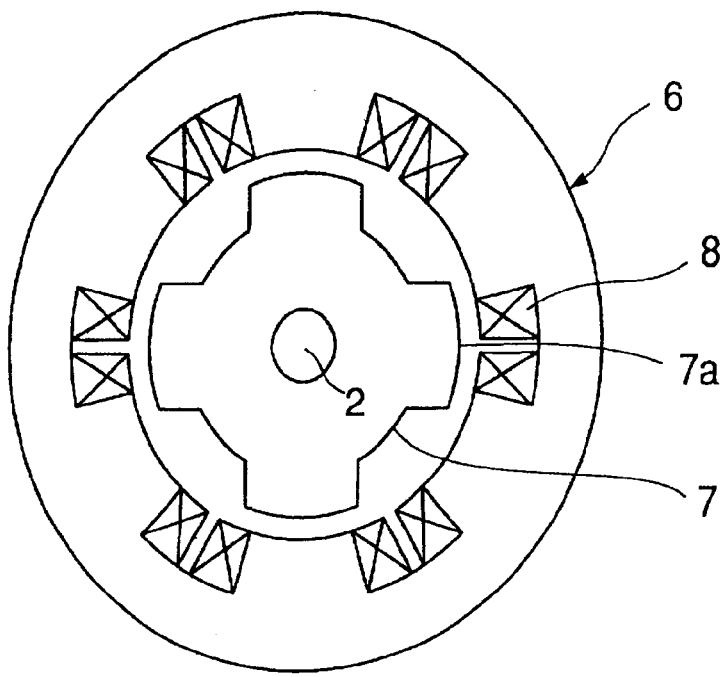
FIG. 5A    FIG. 5B    FIG. 5C
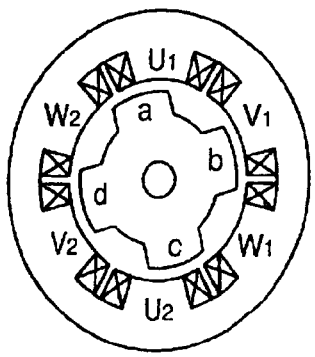 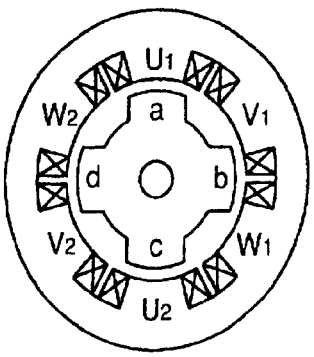 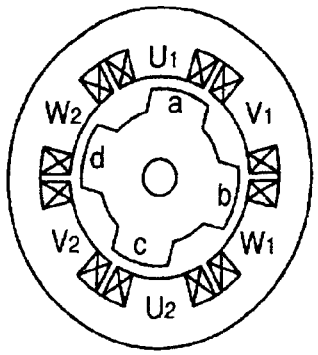

GAS TRANSFER MACHINE

BACKGROUND OF THE INVENTION

1. Field of the Invention

The present invention relates to a gas transfer machine for use as a fan, a vacuum pump, a compressor, or the like for transferring a gas based on the rotation of a rotor, and more particularly to a motor for rotating such a rotor.

2. Description of the Related Art

FIGS. 1 and 2 of the accompanying drawings show a conventional gas-transfer machine for use as a fan, a vacuum pump, a compressor, or the like for transferring a gas. As shown in FIGS. 1 and 2, the conventional gas transfer machine has an induction motor for rotating a rotatable member such as an impeller. Specifically, the conventional gas transfer machine includes a pump rotor 1, a motor rotor 7 directly coupled to the pump rotor 1 by a main shaft 2, and a stator 6 disposed around the motor rotor 7 and having windings 8. When the motor rotor 7 is rotated by a revolving magnetic field generated by the stator 6, the pump rotor 1 is rotated to transfer a gas from a gas inlet 30 to a gas outlet 31. The main shaft 2 is rotatably supported by bearings 3a, 3b. The stator 6 is covered with a can 11 that comprises a thin sheet of metal. The can 11 fully shields the stator 6 for protection against exposure to the gas, which may be corrosive, that may possibly be introduced through the bearing 3b. The motor rotor 7 and the stator 6 make up an induction motor. The motor rotor 7 has secondary conductors 9 in the form of conductive rods of aluminum or the like and end rings 10 joining the ends of the secondary conductors 9.

The conventional gas transfer machine shown in FIGS. 1 and 2 suffers the following problems: While the vacuum pump or compressor as the gas transfer machine is in operation, the gas discharged therefrom is heated when compressed, thereby heating the pump rotor to a high temperature. As a result, the motor rotor that is directly connected to the main shaft is also heated to a high temperature. Since the motor rotor rotates at a high speed, its mechanical strength needs to be taken into account for reliable operation thereof. Such a requirement makes it difficult to design the motor rotor to rotate at a higher speed. However, there is a demand for vacuum pumps and compressors whose motor rotors rotate at higher speeds for higher performance.

Since the induction motor has the secondary conductors in its rotor, the end rings and the secondary conductors pose a strength problem when the rotor rotates at high speeds. The end rings and the secondary conductors are also under thermal stresses at high temperatures. Furthermore, the efficiency of the induction motor cannot be increased because of a loss that is necessarily caused by the secondary conductors and the metal can.

Furthermore, the dimension of coil ends of the induction motor is not minimum because the induction motor usually employs a distributed winding pattern. Consequently, the motor has relatively large dimensions, which make the overall size of the gas transfer machine large.

Another problem of the induction motor is that it causes slippage. The actual rotational speed of the rotor of the induction motor cannot be determined from a power supply system, but needs to be detected by a sensor or the like coupled with the rotor.

The motor rotor that is held in contact with the gas being transferred comprises a composite material of electromagnetic sheet steel and aluminum. Therefore, if the gas being transferred is corrosive, then the motor rotor would be corroded. It is necessary to apply a corrosion-resistant coating to the motor rotor or cover the motor rotor with a can. However, the corrosion-resistant coating on the composite material of electromagnetic sheet steel and aluminum is not reliable and tends to be peeled off easily. The can that covers the motor rotor reduces the efficiency because it widens the gap between the motor rotor and the stator.

SUMMARY OF THE INVENTION

It is therefore an object of the present invention to provide a gas transfer machine which is of a compact structure, is stable in operation even when handling a corrosive gas, and can operate at a high speed.

According to the present invention, there is provided a gas transfer machine comprising a pump rotor mounted on a rotatable shaft for transferring a gas, and a reluctance-type motor for rotating the rotatable shaft about its own axis, the reluctance-type motor comprising a stator, a motor rotor surrounded by the stator, and a shield member isolating the stator from the motor rotor, the motor rotor being directly coupled to the rotatable shaft and having a plurality of magnetic salient poles.

Since the reluctance-type motor has no secondary conductors and end rings on the motor rotor, the motor rotor is of increased mechanical strength upon rotation at a high speed, and has increased efficiency as it causes no current loss. The stator can have concentrated windings on salient poles for minimizing coil ends and hence for reducing the size of the motor.

The shield member may comprise a molded body of synthetic resin having a surface positioned radially inwardly of an inner circumferential surface of the stator, the stator being embedded in the molded body of synthetic resin. The stator can thus be protected by the shield member against contact with the gas, which may be corrosive, so that windings of the stator can be protected. In addition, the molded body of synthetic resin causes no eddy current loss.

Alternatively, the shield member may comprise a can of synthetic resin or nonconductive material. The can of synthetic resin or nonconductive material is also effective to protect the stator and its windings against contact with the gas, which may be corrosive, and causes no current loss.

The motor rotor may have a plurality of permanent magnets disposed respectively in the magnetic salient poles. The permanent magnets in the magnetic salient poles can increase the torque generated by the motor with an increased output power thereof.

The motor rotor is preferably made of permalloy. The motor rotor of permally is resistant to corrosion due to contact with the gas, which may be corrosive, and also provides desired magnetic properties for the motor.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a cross-sectional view taken along line IV—IV of FIG. 3;

FIGS. 5A, 5B, and 5C are cross-sectional views illustrative of the principle of operation of a reluctance-type motor shown in FIG. 4;

DETAILED DESCRIPTION OF THE PREFERRED EMBODIMENTS

Figure 1:
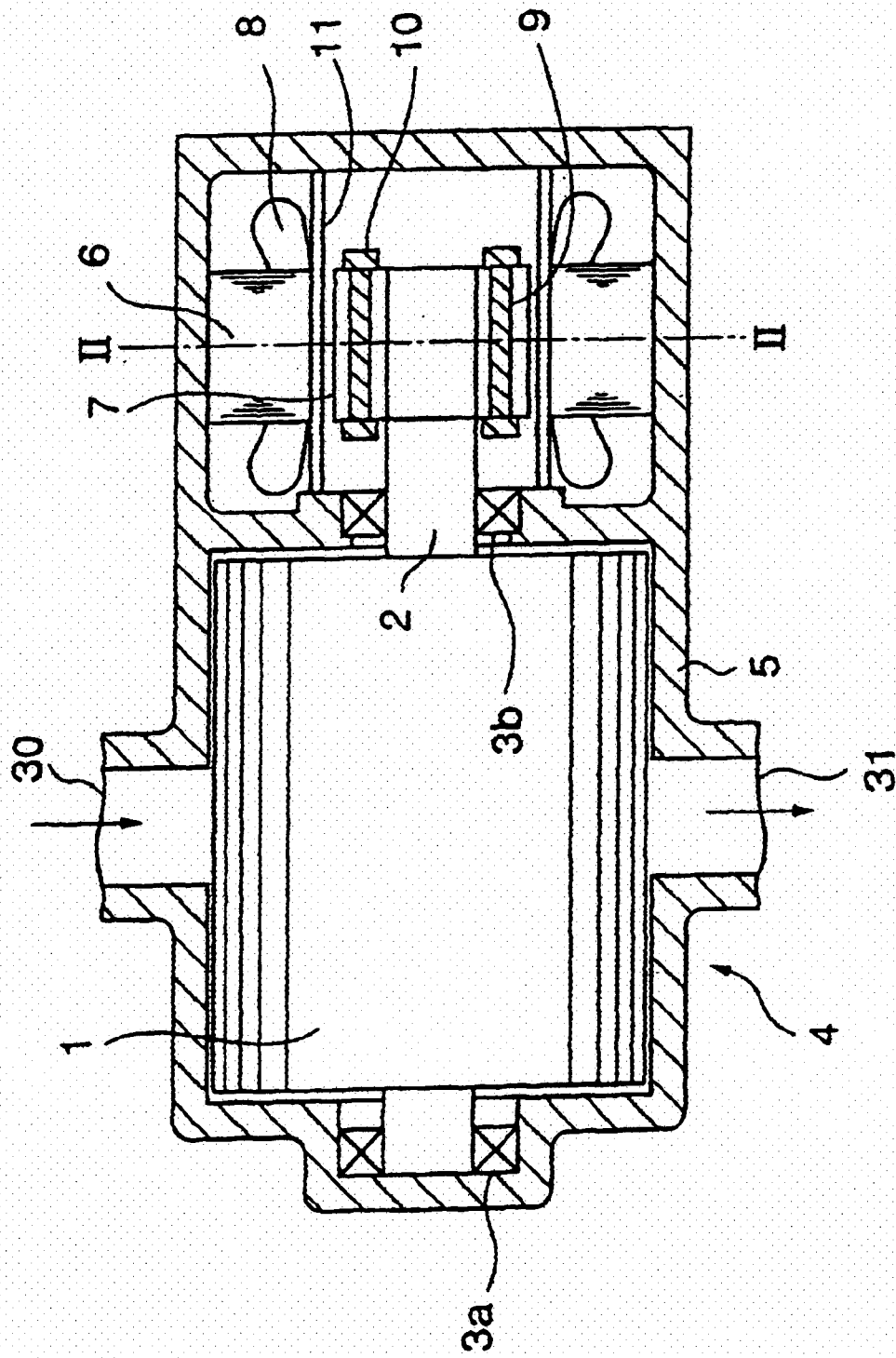
FIG. 1 is an axial cross-sectional view of a conventional gas transfer machine.
Figure 2:
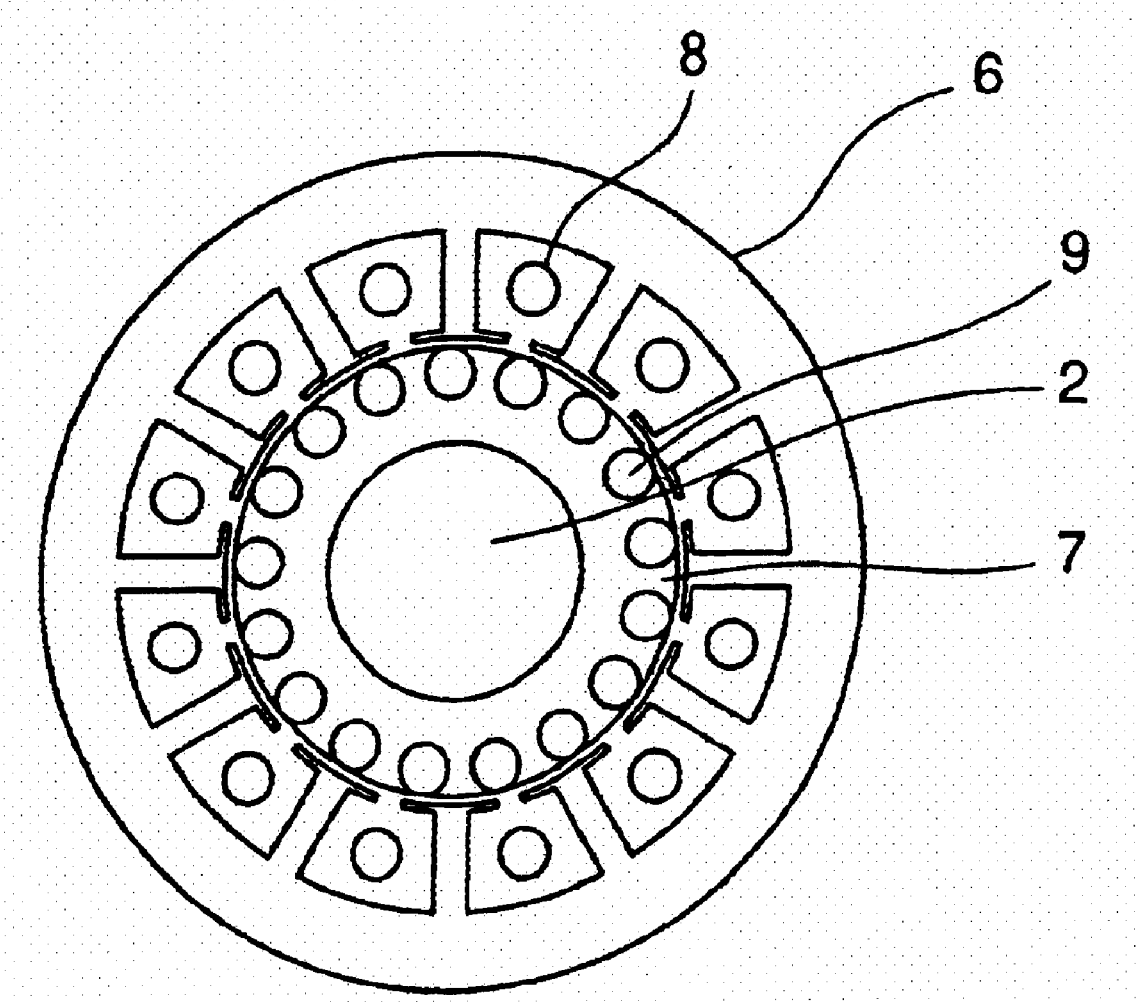
FIG. 2 is a cross-sectional view taken along line II—II of FIG. 1.
Figure 3:
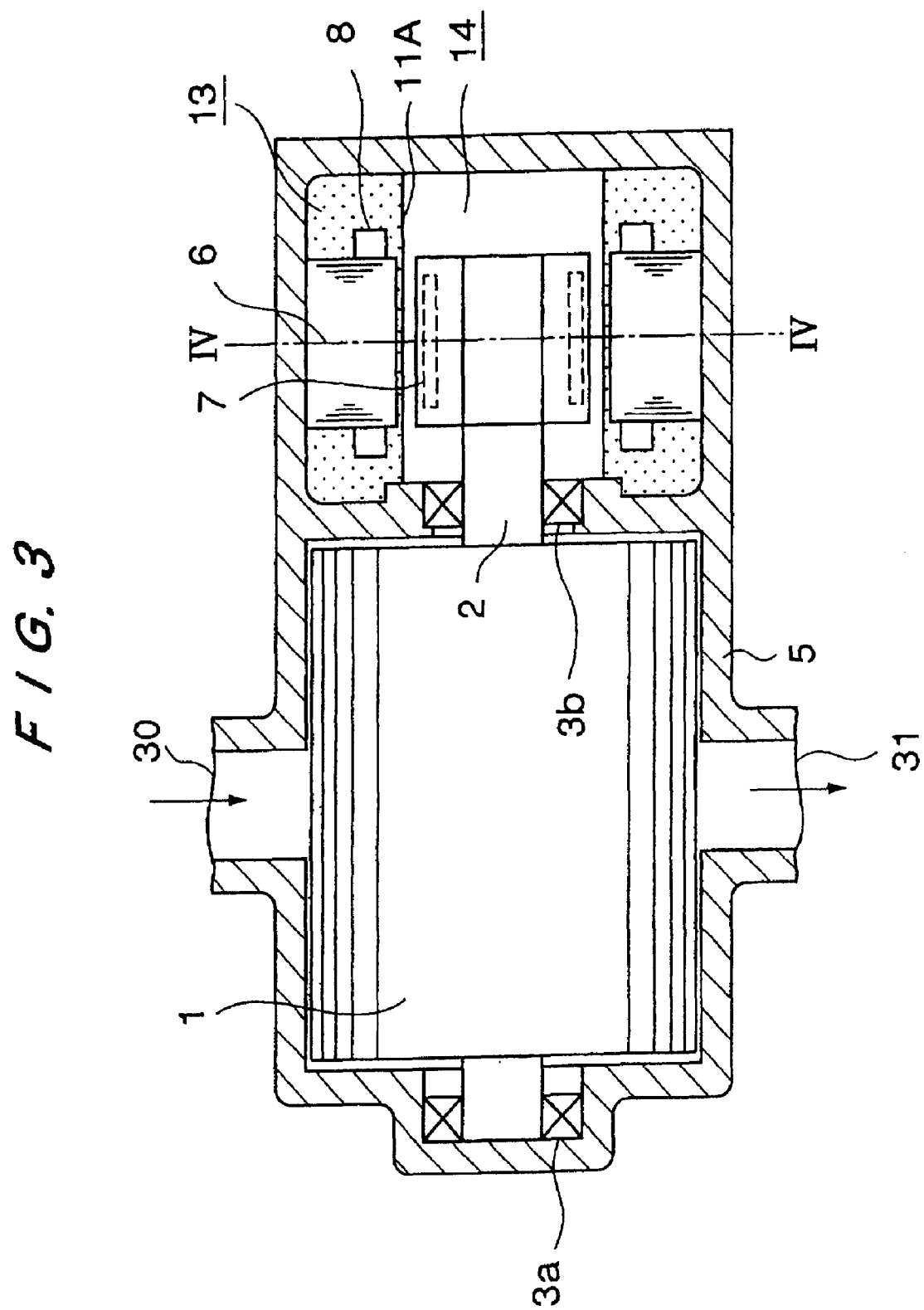
FIG. 3 is an axial cross-sectional view of a gas transfer machine according to a first embodiment of the present invention.

FIGS. 3 and 4 show a vacuum pump as a gas transfer machine according to a first embodiment of the present invention. As shown in FIG. 3, the vacuum pump has a pump rotor 1 and a motor rotor 7 directly coupled to the pump rotor 1 by a main shaft 2, and a stator 6 disposed around the motor rotor 7 and having windings 8 (see also FIG. 2). When the motor rotor 7 is rotated by a revolving magnetic field generated by the stator 6, the pump rotor 1 is rotated to transfer a gas from a gas inlet 30 to a gas outlet 31. The main shaft 2 is rotatably supported by bearings 3a, 3b. As shown in FIG. 2, the motor rotor 7 has salient poles 7a. The motor rotor 7 and the stator 6 make up a reluctance-type motor in which the motor rotor 7 is free of secondary conductors and end rings.

For increasing the efficiency of the motor, the stator 6 is embedded in a molded body 11A of synthetic resin that has a circular inner surface positioned radially inwardly of the inner circumferential surface of the stator 6. The molded body 11A of synthetic resin prevents the windings 8 and the stator 6 from contacting the gas being transferred. Rather than the molded body 11A of synthetic resin, a can of synthetic resin or nonconductive material may be used to cover the stator 6.

As shown in FIG. 4, the stator 6 has six magnetic poles, and the motor rotor 7 has four salient magnetic poles 7a. The windings 8 comprise concentrated windings on salient poles for minimizing coil ends. The reluctance-type motor operates on the principle that the salient poles 7a of the motor rotor 7 are attracted by magnetic forces generated by the magnetic poles of the stator 6.

The principle of operation of the reluctance-type motor will be described below with reference to FIGS. 5A, 5B, and 5C. In FIG. 5A, windings around salient poles U1, U2 are energized to produce magnetic poles, magnetic forces generated thereby attract salient poles a, c of the rotor, rotating them toward the respective salient poles U1, U2. When the rotor reaches the angular position shown in FIG. 5B, the windings around the salient poles U1, U2 are de-energized, and windings around salient poles V1, V2 are energized to produce magnetic poles. Magnetic forces generated thereby attract the salient poles a, c of the rotor, rotating them toward the respective salient poles V1, V2, as shown in FIG. 5C. In this manner, the windings of the stator are successively energized and de-energized to rotate the rotor 7 in synchronism with a revolving magnetic field generated by the stator 6. The rotational speed of the rotor 7 can be recognized by measuring the frequency with which the windings of the stator 6 are energized.

The motor rotor 7 has very high mechanism strength upon rotation at a high speed because it is free of secondary conductors and end rings of aluminum or copper as is the case with an induction motor. Particularly, it is not necessary to take into account the resistance of the conductors to centrifugal forces. The efficiency of the motor is not lowered because no loss is caused by currents flowing through the secondary conductors. In addition, because the windings of the stator 6 comprise concentrated windings on salient poles, it is possible to minimize coil ends, thus reducing the over all size of the vacuum pump.

Figure 6:
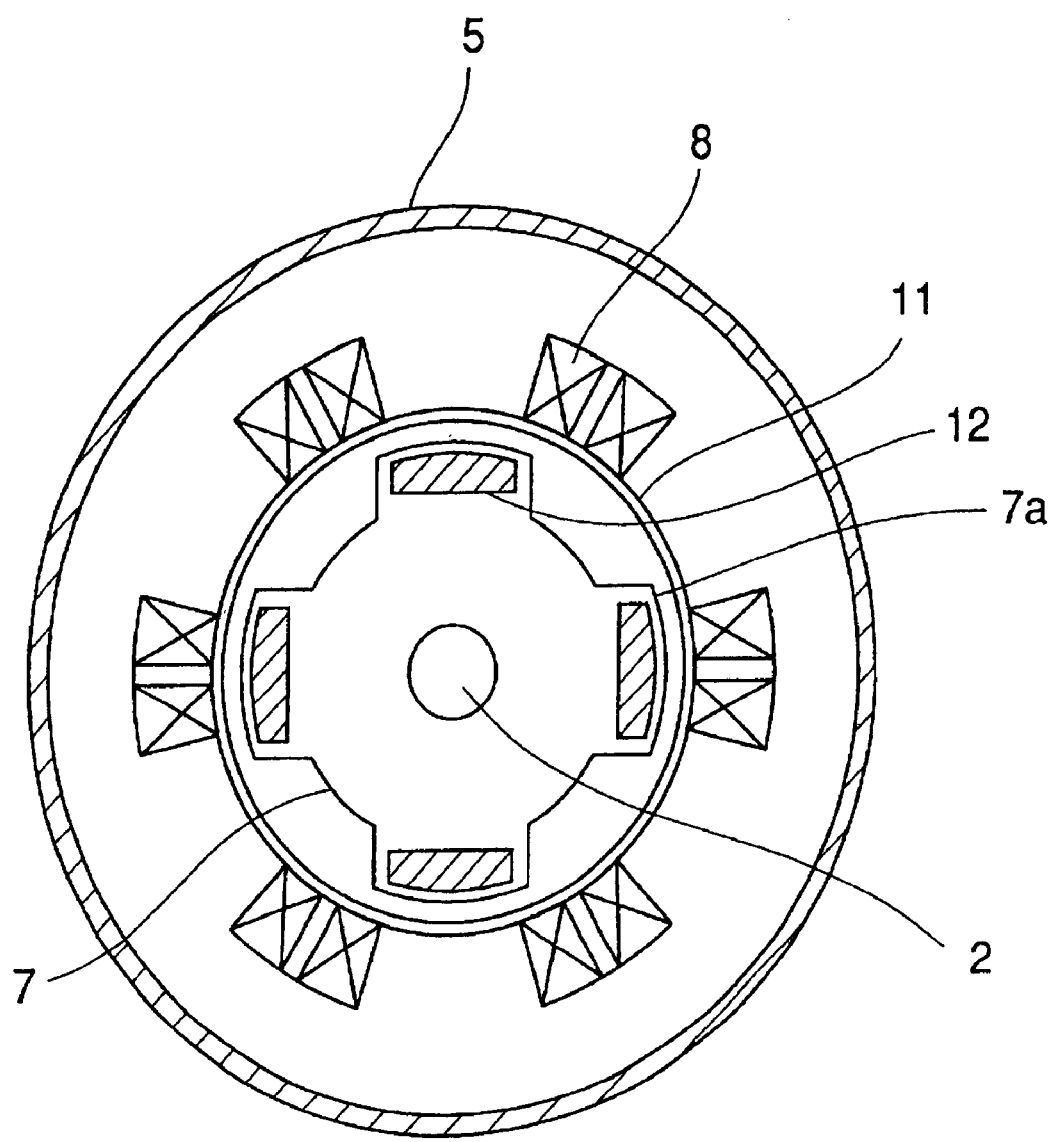
FIG. 6 is a cross-sectional view of a modification of the reluctance-type motor shown in FIG. 4.

FIG. 6 shows a modified reluctance-type motor in cross section. The modified reluctance-type motor shown in FIG. 6 has a motor rotor 7 having salient poles 7a that include respective permanent magnets 12 disposed therein for producing magnetic forces to increase the output power of the motor. The vacuum pump that incorporates the modified reluctance-type motor is required to rotate at a high speed, and discharges the gas at a high temperature from the gas outlet. Since the permanent magnets 12 are disposed in the respective salient poles 7a, the permanent magnets 12 are retained with high mechanical strength in the motor rotor 7 for protection against disintegration. The permanent magnets 12 held in the motor rotor 7 are effective to produce strong magnetic forces tending to rotate the motor rotor 7 for thereby achieving a large torque with increased efficiency.

The vacuum pump may possibly be used in applications where it needs to transfer corrosive gases. The motor rotor 7 may be made of iron-nickel magnetic alloy such as permally or the like for resistance to corrosion due to contact with a corrosive gas that is being delivered by the vacuum pump. Since permally is a magnetic alloy of iron and nickel and has high magnetic properties, it can be used as the material of a core, with the nickel making the core highly resistant to corrosion. According to the principles of operation of the reluctance-type motor as described above, the motor rotor 7 of permalloy is able to produce sufficient rotational forces. Therefore, the motor rotor 7 that is exposed to a corrosive gas being delivered by the vacuum pump is both resistant to corrosion and able to provide desired magnetic properties required for the motor.

The motor rotor 7 of the reluctance-type motor rotates in synchronism with the revolving magnetic field generated by the stator 6. Consequently, the rotational speed of the motor rotor 7 can be recognized by measuring the frequency with which the windings of the stator 6 are energized, and the motor is not required to be combined with a speed sensor or the like for detecting the rotational speed of the motor rotor 7.

The reluctance-type motor according to the present invention is applicable to both a pump having two pump rotors rotatable in synchronism with each other for transferring a gas and a pump having a single pump rotor for transferring a gas.

The stator 6 is embedded in the molded body 11A of synthetic resin. Alternatively, the stator 6 may be covered with a can of synthetic resin or nonconductive material. Since the molded body 11A of synthetic resin or the can of synthetic resin or nonconductive material does not cause an eddy current loss, the efficiency of the motor is increased.

Figure 7:
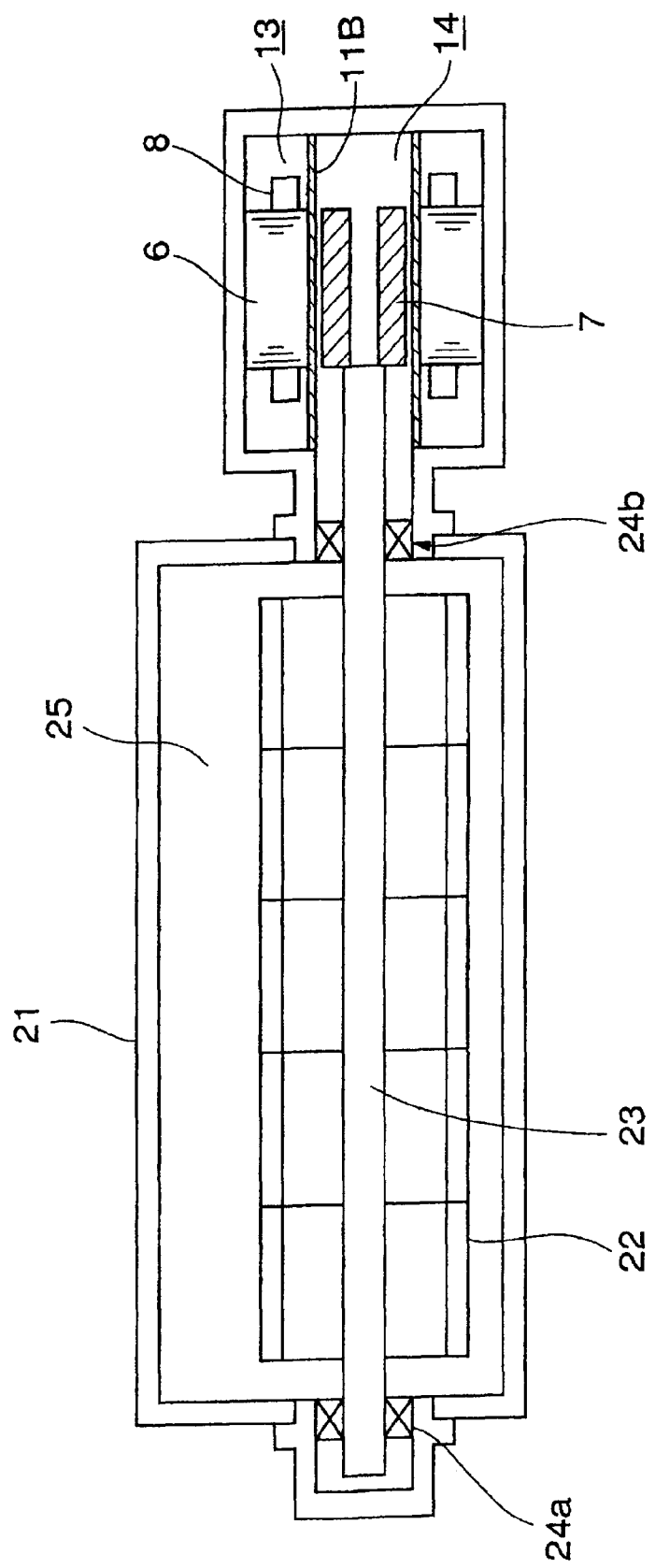
FIG. 7 is an axial cross-sectional view of a gas transfer machine according to a second embodiment of the present invention.

FIG. 7 shows in cross section a gas transfer machine according to a second embodiment of the present invention. As shown in FIG. 7, the gas transfer machine comprises a gas circulating device having a circulating fan 22 disposed in a hermetically sealed housing 21. The hermetically sealed housing 21 is filled with a corrosion-resistant process gas 25 under a predetermined pressure for performing any of various chemical or physical processes. The process gas 25 is circulated in the hermetically sealed housing 21 by the circulating fan 22 to perform the desired chemical or physical process.

The circulating fan 22 in the hermetically sealed housing 21 is mounted on a rotatable shaft 23 whose opposite ends are rotatably supported respective bearings 24a, 24b mounted in respective opposite ends of the housing 21. A motor rotor 7 is coupled to the end of the rotatable shaft 23 which projects from the bearing 24b.

The motor rotor 7 is surrounded by a stator can 11B that is held against the inner circumferential surface of a stator 6 having windings 8. The stator can 11B separates a stator chamber 13 in which the stator 6 is placed from a rotor chamber 14 in which the motor rotor 7 is disposed. The stator can 11B fully isolates the stator chamber 13 from the rotor chamber 14 into which the gas being transferred may possibly enter via the bearing 24B. Therefore, the stator 6 is protected from contact with the gas, which may be corrosive. The stator can 11B comprises a thin-walled cylindrical member of synthetic resin. Since the stator can 11B is nonconductive, it causes no eddy current loss.

The gas circulating device shown in FIG. 7 may be incorporated in an excimer laser device, for example. In the excimer laser device, a halogen-base gas such as a highly reactive fluorine gas is supplied as the process gas 25 to the oscillator of the excimer laser device, and hence needs to be circulated in the excimer laser device. Therefore, the motor rotor 7 is preferably made of permally that is a ferromagnetic material and resistant to corrosion against halogen-base gases. Since the motor rotor 7 is of a unitary structure, it may be coated with a corrosion-resistant layer such as a plated nickel layer that remains highly sticky to the motor rotor 7 for protection against being peeled off.

Alternatively, the motor rotor 7 may be made of a ferromagnetic material such as electromagnetic soft iron, for example, and plated with nickel.

The principles of the present invention are not limited to the vacuum pump and the gas circulating device, but are also applicable to various gas transfer machines.

Although certain preferred embodiments of the present invention have been shown and described in detail, it should be understood that various changes and modifications may be made therein without departing from the scope of the appended claims.

What is claimed is:

1. A gas transfer machine for transferring a gas including a corrosive gas comprising:
    a pump rotor mounted on a rotatable shaft for transferring the gas including a corrosive gas;
    a reluctance-type motor for rotating said rotatable shaft about its own axis directly coupled thereto said pump rotor and said motor being disposed in a housing;
    a motor rotor having salient poles said motor rotor being made of highly-corrosion-resistant metal magnetic material, each of said salient poles being a protrusion portion of unitary formed rotating body;
    a motor stator having magnetic poles; said stator being enclosed in a highly-corrosion-resistant synthetic resin material molding which has a surface position radially inwardly of an inner circumferential surface of said stator,
    wherein said salient poles of the motor rotor are attracted to rotate by magnetic forces generated by said poles of said stator.

2. A gas transfer machine according to claim 1, wherein said metal magnetic material comprises a magnetic alloy of iron and nickel.

3. A gas transfer machine according to claim 1, wherein said metal magnetic material comprises a permalloy.

4. A gas transfer machine according to claim 1, wherein said highly-corrosion-resistant synthetic resin material molding comprises a can of synthetic resin or nonconductive material.

5. A gas transfer machine according to claim 1, wherein said gas transfer machine comprises a gas circulating device having a circulating fan.

6. A gas transfer machine according to claim 1, wherein said gas transfer machine comprises a vacuum pump.

7. A gas transfer machine for transferring a gas including a corrosive gas, comprising:
    a pump rotor mounted on a rotatable shaft for transferring a gas including a corrosive gas;
    a reluctance-type motor for rotating said rotatable shaft about its own axis directly coupled thereto said pump rotor and said motor being disposed in a housing;
    a motor rotor having salient poles said motor rotor being made of highly-corrosion-resistant metal magnetic material, each of said salient poles being a protrusion portion of unitary formed rotating body, each of said salient poles having a permanent magnet enclosed within said protrusion portion of said unitary formed rotating body;
    a motor stator having magnetic poles, said stator being enclosed in a highly-corrosion-resistant synthetic resin material molding which has a surface positioned radially inwardly of an inner circumferential surface of said stator,
    wherein said salient poles of the motor rotor are attracted to rotate by magnetic forces generated by said poles of said stator.

8. A gas transfer machine according to claim 7, wherein said stator is embedded in a molded body of said resin material.

9. A gas transfer machine according to claim 7, wherein said highly-corrosion-resistant synthetic resin material molding comprises a can of synthetic resin or nonconductive material.

* * * * *